US006458470B1

(12) United States Patent
DeLisio et al.

(10) Patent No.: US 6,458,470 B1
(45) Date of Patent: Oct. 1, 2002

(54) HIGH BARRIER MULTILAYER FILM

(75) Inventors: John P. DeLisio, Bridel (LU); Robert G. Peet, Pittsford, NY (US)

(73) Assignee: ExxonMobil Oil Corporation, Fairfax, VA (US)

(*) Notice: Subject to any disclaimer, the term of this patent is extended or adjusted under 35 U.S.C. 154(b) by 0 days.

(21) Appl. No.: 09/349,874

(22) Filed: Jul. 8, 1999

(51) Int. Cl.⁷ .............................................. B32B 27/32
(52) U.S. Cl. ..................... 428/516; 428/518; 428/910
(58) Field of Search .................. 428/516, 518, 428/910

(56) References Cited

U.S. PATENT DOCUMENTS

| | | | |
|---|---|---|---|
| 4,603,174 A | 7/1986 | Okada et al. ................. 525/240 |
| 5,419,960 A | * 5/1995 | Touhsaent .................... 428/331 |
| 5,462,807 A | 10/1995 | Halle et al. .................. 428/500 |
| 5,468,440 A | 11/1995 | McAlpin et al. ............. 264/291 |
| 5,500,282 A | 3/1996 | Heffelfinger et al. ........ 428/339 |
| 5,527,608 A | 6/1996 | Kemp-Patchett et al. ... 428/349 |
| 5,529,843 A | 6/1996 | Dries et al. .................. 428/336 |
| 5,536,773 A | 7/1996 | Yamada et al. .............. 524/499 |
| 5,579,913 A | 12/1996 | Yamada et al. .............. 206/531 |
| 5,585,441 A | 12/1996 | Brandes et al. .............. 525/193 |
| 5,595,827 A | 1/1997 | Yamada et al. .............. 428/516 |
| 6,165,599 A | * 12/2000 | Demeuse .................... 428/213 |

FOREIGN PATENT DOCUMENTS

| EP | 0668157 | 2/1995 |
|---|---|---|
| WO | WO9500333 | 1/1995 |
| WO | WO-00/61679 A | * 10/2000 |

OTHER PUBLICATIONS

Encyclopedia of Polymer Science "Ethylene Polymers" vol. 6, 423, 1985.*

* cited by examiner

Primary Examiner—D. Lawrence Tarazano
(74) Attorney, Agent, or Firm—Dennis P. Santini; Rick F. James

(57) ABSTRACT

The present invention is a high barrier multilayer film particularly suitable for packaging. The high barrier multilayer film is a film including (a) a core substrate layer having an isotactic polypropylene produced from Ziegler-Natta catalysts, and (b) an adjacent layer on at least one surface of the core substrate layer, wherein the adjacent layer (b) comprises an isotactic polypropylene produced from metallocene catalysts; or the high barrier multilayer film includes (a') a core substrate layer having an isotactic polypropylene produced from metallocene catalysts, and (b') an adjacent layer on at east one surface of the core substrate layer, wherein the adjacent layer (b') comprises an isotactic polypropylene produced from Ziegler-Natta catalysts.

10 Claims, No Drawings

HIGH BARRIER MULTILAYER FILM

BACKGROUND OF THE INVENTION

The present invention is directed to a high barrier multilayer film, and more particularly to a high barrier multilayer film having polymer layers produced from Ziegler-Natta and metallocene catalysts.

Polymeric films are widely used in many industrial applications. One particularly important application is the food packaging industry. Films employed in the food packaging industry are chosen to provide barrier characteristics necessary for proper food containment. Such barrier characteristics include water vapor barrier, oxygen and gas barrier, as well as flavor and aroma barrier properties.

Polypropylene is a polymer commonly employed in films used in the food packaging industry. In the case of multilayer films, polypropylene may be used in the base or core layer, or may be used in layers intermediate between the core and skin layers. Often, the polypropylene layers are modified to vary the barrier characteristics from those exhibited in the unmodified state. For example, a resinous modifier, additive, and/or second polymer, may be blended with the polypropylene.

Attempts to vary the characteristics of polypropylene are often directed toward the improvement of the moisture barrier properties and machinability provided by the films formed of such polymer.

U.S. Pat. No. 5,620,803, issued Apr. 15, 1997 to Oyama et al., discloses a heat shrinkable polypropylene laminate film having two surface layers of isotactic polypropylene and an intermediate layer of syndiotactic polypropylene.

U.S. Pat. No. 5,500,282, issued Mar. 19, 1996 to Heffelfinger et al, is directed to a high moisture barrier oriented polypropylene film containing a high crystallinity polypropylene and a terpene polymer.

U.S. Pat. No. 5,451,455, issued Sep. 19, 1995 to Peiffer, discloses a biaxially oriented polypropylene film consisting of a base layer of propylene polymer and a low molecular weight resin and at least one additional layer on the base layer, in which the additional layer is readily subjected to corona treatment. The propylene polymer has a melting point of at least 140° C., a melt flow index in the range of about 0.5 g/10 min., and an n-heptane-soluble fraction of less than about 15% by weight.

U.S. Pat. No. 5,595,827, issued Jan. 21, 1997 to Yamada et al., relates to a polypropylene resin composition consisting of a crystalline polypropylene having a high stereoregularity, and terpene and petroleum resins having no polar group. The crystalline polypropylene has a melt flow rate at 230° C. under a load of 2.16 kg in the range of 0.1 to 500 g/10 min. and a crystallinity as determined by the components insoluble in boiling heptane of at least 60%.

Despite these advances in the art, the conventional films in the art are not without disadvantages. Particularly, polypropylene suffers a significant decrease in dimensional stability when blended with certain materials. This in turn hinders the machinability and processability of the resultant films, resulting in increased manufacturing costs and/or films of inferior quality. Certain polypropylene materials, for example, polypropylenes synthesized with metallocene catalysts have narrow molecular weight distribution, and thus would not be expected to provide as good operability in the production of oriented polypropylene films as resins with broad molecular weight distribution, but having all other resin characteristics essentially the same.

There exists a continuing need for multilayer films having improved barrier properties, while maintaining machinability and processability.

It is therefore an object of the present invention to provide a polypropylene multilayer film which exhibits improved barrier properties.

It is also an object of the present invention to provide a polypropylene multilayer film which exhibits increased machinability and processability.

It is also another object of the present invention to make these improvements at improved economics.

For better understanding of the present invention, reference is made to the following description and examples, the scope of which is pointed out in the appended claims.

SUMMARY OF THE PRESENT INVENTION

The present invention is a high barrier multilayer film particularly suitable for packaging. The high barrier multilayer film is a film including (a) a core substrate layer having an isotactic polypropylene produced from Ziegler-Natta catalysts, and (b) an adjacent layer on at least one surface of the core substrate layer, wherein the adjacent layer (b) comprises an isotactic polypropylene produced from metallocene catalysts; or the high barrier multilayer film includes (a') a core substrate layer having an isotactic polypropylene produced from metallocene catalysts, and (b') an adjacent layer on at least one surface of the core substrate layer, wherein the adjacent layer (b') comprises an isotactic polypropylene produced from Ziegler-Natta catalysts.

In one preferred embodiment, the high barrier multilayer film further includes a resinous component blended into the Ziegler-Natta catalyzed layer. The resinous component can be based on natural or synthetic sources. Examples of the resinous component include, but are not limited to, hydrocarbon resins such as petroleum resins, styrene resins, cyclopentadiene resins, alicyclic hydrocarbon resins, terpene resins and mixtures thereof Preferred resinous components are alicyclic hydrocarbon resins and terpene resins. In general, these resinous components are typically 2–4 times as expensive as the polypropylene they are replacing in the blends. It is therefore preferred to keep the amount of the resinous component in the overall structure to a comparatively low level of about 1 to about 15%. This can be accomplished by incorporating them in chosen layers where they are particularly beneficial.

In another preferred embodiment, the high barrier multilayer film further includes at least one coating layer adhered to the outer surface of the topmost contiguous layer. The coating layer consists of ethylene methyl acrylate polymers, ethylene acrylic acid polymers, mixtures thereof, as well as other acrylic and vinyl polymers.

The core, intermediate, skin, and coating layers can optionally include conventional additives. Examples of the additives include, but are not limited to, antiblocking agents, antistatic agents, and slip agents.

As a result, the present invention advantageously provides a multilayer film exhibiting improved moisture barrier properties. Additionally, the multilayer film of the present invention exhibits increased dimensional stability in the resultant film. The resultant film also has a high degree of machinability and processability, resulting in better quality film and reduced manufacturing costs.

For a better understanding of the present invention, together with other and further objects, reference is made to the following description and its scope will be pointed out in the appended claims.

DETAILED DESCRIPTION OF THE INVENTION

The present invention is a high barrier multilayer film, which includes (a) a core substrate layer having an isotactic polypropylene produced from Ziegler-Natta catalysts; and (b) an adjacent layer on at least one surface of the core substrate layer, wherein the adjacent layer (b) is an isotactic polypropylene produced from metallocene catalysts. Alternatively, the high barrier multilayer film can include (a') a core substrate layer comprising an isotactic polypropylene produced from metallocene catalysts and (b') at least one adjacent layer (b'), comprising an isotactic polypropylene produced from Ziegler-Natta catalysts.

The Ziegler-Natta catalyzed isotactic polypropylene of the core substrate layer is commercially available from the stereo regular polymerization of propylene based on the use of Ziegler-Natta catalysts. Such catalysts generally are reaction products of an organometallic compound belonging to Groups IA to IIIA with a compound of a transition metal of Groups IVB to VIII, as described in greater detail by G. Crespi and L. Luciani in "Olefin Polymers (Polypropylene)," Kirk-Othmer Encyclopedia of Chemical Technology, Third Edition, John Wiley & Sons, New York (1981), Volume 16, pages 453–469, the entire contents of which are incorporated by reference herein. Ziegler-Natta polypropylenes have broad molecular weight distribution, and, as a consequence, have good stretching characteristics. The molecular weight distribution of the Ziegler-Natta polypropylenes of the present invention, defined as the moment average molecular weight, $M_z$, divided by the weight average molecular weight, $M_w$, is in the range of from about 2.5 to about 8, preferably from about 3 to about 7, and more preferably from about 3 to about 5.

Ziegler-Natta polypropylenes are commercially available, for example Exxon 4612 polypropylene, Fina 3371 polypropylene, and Amoco 6361 polypropylene.

Preferably, the Ziegler-Natta catalyzed layer of the present invention can be a blend of an isotactic polypropylene produced by Ziegler-Natta catalysts and a resinous component. The resinous component can be based on natural or synthetic materials. These are generally 2–4 times as expensive as the polypropylene that they replace in the blends. It is thus a purpose of this invention to keep the resinous component at a relatively low level, based on the overall structure from about 1 to about 15%.

The resinous component can be a low molecular weight resin, preferably having a softening point of about 115° C. to about 180° C., preferably to about 115° C. to about 160° C. Among the numerous low molecular weight resins available, hydrocarbon resins are preferred, in particular, petroleum resins, styrene resins, cyclopentadiene resins, terpene resins, alicyclic and saturated alicyclic hydrocarbon resins and mixtures thereof. Preferred resins are saturated alicyclic hydrocarbon resins and terpene resins.

The petroleum resins to be utilized are typically prepared in the presence of a catalyst and by polymerization of highly cracked petroleum materials. These petroleum materials usually contain a mixture of resin-forming substances such as ethylindene, butadiene, isoprene, piperylene, pentylene, styrene, methylstyrene, vinyltoluene, and indene.

The styrene resins are homopolymers of styrene or copolymers of styrene with other monomers, such as alpha methylstyrene, vinyltoluene, and butadiene.

The cyclopentadiene resins are cyclopentadiene homopolymers or cyclopentadiene copolymers which are obtained from coal-tar distillates and fractionated natural gas. These resins are prepared by reacting the cyclopentadiene-containing materials at a high temperature, frequently in the presence of a catalyst.

The terpene resins are polymers of terpenes, i.e., hydrocarbons of the formula $C_{10}H_{16}$, which are present in almost all ethereal oils or oil-containing resins in plants, and phenol-modified terpene resins. Alpha-pinene, beta-pinene, dipentene, limonene, myrcene, camphene, and similar terpenes are some examples of terpenes polymerized into resins.

Saturated alicyclic hydrocarbon resins used in the present invention are obtained by hydrogenation of aromatic hydrocarbon resins. The aromatic resins are obtained by polymerizing reactive unsaturated hydrocarbons containing aromatic hydrocarbons in which reactive double bonds are generally in side-chains. The saturated alicyclic resins are obtained from the aromatic resins by hydrogenating the latter until all, or almost all, of the unsaturation has disappeared, including the double bonds in the aromatic rings. Although the aromatic hydrocarbons useful in the preparation of the alicyclic resins are mainly compounds containing reactive double bonds in side-chains, they may also comprise aromatic hydrocarbons having reactive double bonds in condensed ring systems. Examples of such useful aromatic hydrocarbons include vinyltoluene, vinylxylene, propenylbenzene, styrene, methylstyrene, indene, methylindene and ethylindene. Mixtures of several of these hydrocarbons may be used. Examples of commercially available alicyclic resins suitable for use in the present invention are those sold under the trademark ARKON-P by Arakawa Forest Chemical Industries, Ltd. of Japan.

The resinous component blended with the Ziegler-Natta polypropylene is present from about 0.5% by weight to about 50% by weight, preferably from about 1% by weight to about 30% by weight.

By the addition of the resinous component to the Ziegler-Natta catalyzed substrate layer, the moisture barrier properties are greatly improved. The moisture barrier properties of the metallocene catalyzed substrate layer are inherently superior to the barrier properties of comparable Ziegler-Natta catalyzed polypropylene substrate layers. By using layers of Ziegler-Natta catalyzed polypropylene substrate containing the resinous component in combination with layers of metallocene-catalyzed polypropylene, processability and costs are greatly improved.

The core substrate layer of the present invention has a thickness ranging from about 0.05 mils to about 5.0 mils, preferably from about 0.2 mils to about 3.0 mils, and more preferably from about 0.4 mils to about 2.5 mils.

The film of the present invention includes (a) a separate layer adjacent to at least one surface of the core Ziegler-Natta catalyzed polypropylene substrate layer; the separate adjacent layer is an isotactic polypropylene produced from metallocene catalysts; the multiple layers can be applied on the surface of the core substrate layer by any manner known in the art; preferably, the adjacent layer can be coextruded with the core substrate layer; two adjacent layers can also be simultaneously coextruded on both sides of the core substrate layer to provide an A/B/A structure; or the film of the present invention includes (b) a separate layer adjacent to at least one surface of the core metallocene catalyzed polypropylene substrate layer; the separate adjacent layer is an isotatic polypropylene produced from Ziegler-Natta catalysts; the multiple layers can be applied on the surface of the core substrate layer by any manner known in the art;

preferably the adjacent layer can be coextruded with the core substrate layer; two adjacent layers can also be simultaneously coextruded on both sides of the core substrate layer to provide a B/A/B structure.

The polypropylene of the metallocene-catalyzed polypropylene layer is produced from at least one metallocene or constrained geometry catalyst, e.g. bridged, biscyclopentadienyl, Groups IV, V or VI transition metal, dihalide or dialkyl derivatives. Specific metallocene catalysts known to be useful for producing isotactic polypropylene are discussed in U.S. Pat. Nos. 5,145,819; 5,296,434; and 5,468,440 which are incorporated by reference herein. The chains of the polypropylenes produced from metallocene catalysts are more uniform. This in turn improves the crystallinity, resulting in greater barrier properties for comparable metallocene catalyzed polypropylene layers when compared to Ziegler-Natta catalyzed polypropylenes of similar molecular weight.

The molecular weight distribution of the metallocene polypropylenes of the present invention defined as the moment average molecular weight, $M_z$, divided by the weight average molecular weight, $M_w$, is in the range of from about 1.0 to about 4.0, preferably from about 1.0 to about 3.0, and more preferably from about 1.5 to about 2.5.

Metallocene polypropylenes are currently available from Fina, Exxon, and Targor.

The layer(s) adjacent to the core of the present invention has (have) a thickness ranging from about 0.05 mils to about 4.0 mils, preferably from about 0.1 mils to about 2.0 mils, and more preferably from about 0.1 mils to about 1.0 mils.

The film of the present invention optionally includes at least one coating layer on at least one outer surface of the skin layer. The coating layer forms a smooth layer on the surface of the resultant film. The coating layer may provide improved water, oxygen, and gas barrier properties, flavor and aroma barrier properties, heat sealing properties, etc.

The coating layer consists of ethylene methyl acrylate, ethylene acrylic acid or mixtures thereof. The coating layer can be applied on the surface of the skin layer by any manner known in the art.

In order to further improve certain properties of the resultant film, effective amounts of additives such as antiblocking agents, antistatic agents or slip agents may be blended in the core layer, layers adjacent to the core, skin layers or coating layers.

Suitable antiblocking agents include, but are not limited to, silica, talc, clay, sodium aluminum silicate, and conventional inorganic anti-blocks.

Suitable antistatic agents include, but are not limited to, alkali alkane sulfonates and essentially straight-chain, saturated aliphatic tertiary amines.

Suitable slip agents include, but are not limited to, aliphatic acid amides, aliphatic acid esters, waxes, metallic soaps and polydimethylsiloxanes.

The resultant film of the present invention has a thickness ranging from about 0.2 mils to about 5.0 mils, preferably from about 0.4 to about 3.0 mils, and more preferably from about 0.5 mils to about 3.0 mils. The preferred resultant film is biaxially oriented.

EXAMPLES

The following examples illustrate the present invention. Example 1 below is a comparative example illustrating the moisture properties of a prior art film. Examples 2 and 3 illustrate the improved and unexpected properties exhibited by the films of the present invention. Moisture barrier WVTR in each of the following examples was measured at 100° C. and 90% Relative Humidity (ASTM F 372) and is expressed in g/100 in$^2$/day/mil.

Example 1

Comparative Example

Sample 1 was produced to demonstrate the moisture barrier of a conventional polypropylene-based film. A 5-layer structure was co-extruded having a Ziegler-Natta catalyzed isotactic polypropylene homopolymer (Fina 3371) in the core and the two layers adjacent to the core, and having skin layers of two different ethylene-propylene-butylene terpolymers.

The ABBBD extrudate was quenched, reheated, and stretched 4 to 6 times in the machine direction at approximately 220° F. to 290° F. Subsequently, the MD oriented base sheet was stretched 8 to 12 times in the transverse direction at approximately 330° F. to 380° F.

Final film thickness was about 1 mil. The total skin thickness was about 0.05 mils. The core layer was about 0.75 mils. The layers adjacent to the core totaled about 0.20 mils.

The resultant film of Sample 1 is illustrated in Table 1 below.

TABLE 1

| Sample | Core Layer | % Resinous Modifier | Skin Layer | WVTR |
|---|---|---|---|---|
| 1 | Fina 3371 | None | ethylene-propylene-butylene terpolymers | 0.35 |

Example 2

Example of Present Invention

A five layer biaxially oriented film having an approximate final thickness of 1.0 mil was prepared by coextrusion. The core substrate layer included a blend of about 95% by weight of polypropylene produced from Ziegler-Natta catalysts (Fina 3371 polypropylene) and about 5% by weight of hydrocarbon resin (saturated alicyclic hydrocarbon resin Arkon P115 from Arakawa). The two layers adjacent to the core were produced from metallocene catalysts. Outside layers consisted of two ethylene-propylene-butylene terpolymer sealant resins.

The ABCBD extrudate was quenched, reheated, and stretched five times in the machine direction at approximately 220° F. to 265° F. Subsequently, the MD oriented base sheet was stretched nine times in the transverse direction at approximately 310° F. to 380° F.

The resultant film of Example 2 is illustrated in Table 2 below.

TABLE 2

| Sample | Core Layer | Percent Resinous Modifier | Adjacent Layers | WVTR | Percent Improvement |
|---|---|---|---|---|---|
| 2 | Fina 3371 + Arkon P115 | 5% | Metallocene-Catalyzed Polypropylene Fina EOD 97-09 | 0.32 | 9% |

Example 3

Example of Present Invention

A five layer biaxially oriented film having an approximate final thickness of 1.0 mil was prepared by coextrusion. The core substrate layer consisted of a metallocene catalyzed isotactic polypropylene. The two layers adjacent to the core consisted of a blend of about 5% by weight of a hydrocarbon resin (saturated alicyclic hydrocarbon resin, Arkon P115 from Arakawa) and about 95% by weight of polypropylene produced from Ziegler-Natta catalysts (Fina 3371 polypropylene). Outside layers consisted of two ethylene-propylene-butylene terpolymer sealant resins.

The ABCBD extrudate was quenched, reheated, and stretched five times in the machine direction at approximately 220° F. to 265° F. Subsequently, the MD oriented base sheet was stretched nine times in the transverse direction at approximately 310° F. to 380° F.

The resultant film of Sample 3 is illustrated below.

TABLE 3

| Sample | Core Layer | Adjacent Layers | Percent Resinous Modifier | WVTR | Percent Improvement |
|---|---|---|---|---|---|
| 3 | Fina EOD 97-09 metallocene-catalyzed polypropylene | Fina 3371 + Arkon P115 | 5% | 0.31 | 11% |

As illustrated in Examples 1 to 3, the films of the present invention (Examples 2 and 3) exhibit better barrier properties than the conventional film (Example 1). Operability of the orienter in producing both of the multi-layer sample structures of the present invention was excellent or as good as achieved for the control.

While there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A barrier multilayer film, which comprises:
   (a) a core substrate layer comprising an isotactic polypropylene produced from Ziegler-Natta catalysts; and (b) an adjacent layer on at least one surface of said core substrate layer, said adjacent layer (b) comprises an isotactic polypropylene produced from metallocene catalysts;
   wherein the core substrate layer (a) further comprises a resinous component, the barrier multilayer film further comprises at least one coating layer on an outer surface of the adjacent layer (b), the at least one coating layer comprises a polymeric material selected from the group consisting of ethylene methyl acrylate polymer, ethylene acrylic acid polymer and mixtures thereof, and the barrier multilayer film is a barrier to at least moisture.

2. The barrier multilayer film of claim 1, wherein said resinous component is selected from the group consisting of petroleum resins, styrene resins, cyclopentadiene resins, saturated alicyclic hydrocarbon resins, non-saturated alicyclic hydrocarbon resins, terpene resins and mixtures thereof.

3. The barrier multilayer film of claim 2, wherein the resinous component is a saturated alicyclic hydrocarbon resin or a terpene resin.

4. The barrier multilayer film of claim 1, wherein at least one of said core and adjacent layers further comprise any additive selected from the group consisting of antiblocking agents, antistatic agents, and slip agents.

5. A barrier multilayer film, which comprises:
   (a) a core substrate layer comprising an isotactic polypropylene produced from Ziegler-Natta catalysts; and (b) an adjacent layer on at least one surface of said core substrate layer, said adjacent layer (b) consisting of an isotactic polypropylene produced from metallocene catalysts and, optionally, one or more additives selected from the group consisting of antiblocking agents, antistatic agents, and slip agents;
   wherein the core substrate layer (a) further comprises a resinous component, the barrier multilayer film further comprises at least one coating layer on an outer surface of the adjacent layer (b), the at least one coating layer comprises a polymeric material selected from the group consisting of ethylene methyl acrylate polymer, ethylene acrylic acid polymer and mixtures thereof, and the barrier multilayer film is a barrier to at least moisture.

6. A barrier multilayer film, which comprises:
   (a) a core substrate layer comprising an isotactic polypropylene produced from metallocene catalysts; and (b) an adjacent layer on at least one surface of said core substrate layer, said adjacent layer (b) comprises an isotactic polypropylene produced from Ziegler-Natta catalysts,
   wherein said adjacent layer (b) further comprises a resinous component, the barrier multilayer film further comprises at least one coating layer on an outer surface of the adjacent layer (b), the coating layer comprises a polymeric material selected from the group consisting of ethylene methyl acrylate polymer, ethylene acrylic acid polymer and mixtures thereof, and the barrier multilayer film is a barrier to at least moisture.

7. The barrier multilayer film of claim 6, wherein said resinous component is selected from the group consisting of petroleum resins, styrene resins, cyclopentadiene resins, saturated alicyclic hydrocarbon resins, non-saturated alicyclic hydrocarbon resins, terpene resins and mixtures thereof.

8. The barrier multilayer film of claim 6, wherein the resinous component is a saturated alicyclic hydrocarbon resin or a terpene resin.

9. The barrier multilayer film of claim 6, wherein at least one of said core and adjacent layers further comprises any additive selected from the group consisting of antiblocking agents, antistatic agents, and slip agents.

10. A barrier multilayer film, which comprises:
    (a) a core substrate layer consisting of an isotactic polypropylene produced from metallocene catalysts and, optionally, one or more additives selected from the group consisting of antiblocking agents, antistatic agents, and slip agents; and (b) at least one adjacent layer on at least one surface of said core substrate layer, said adjacent layer (b) comprises an isotactic polypropylene produced from Ziegler-Natta catalysts,
    wherein said adjacent layer (b) further comprises a resinous component, the barrier multilayer film further comprises at least one coating layer on an outer surface of the adjacent layer (b), the coating layer comprises a polymeric material selected from the group consisting of ethylene methyl acrylate polymer, ethylene acrylic acid polymer and mixtures thereof, and the barrier multilayer film is a barrier to at least moisture.

* * * * *